United States Patent [19]
Shimizu

[11] Patent Number: 5,832,317
[45] Date of Patent: Nov. 3, 1998

[54] ZOOMING DEVICE

[75] Inventor: Hitoshi Shimizu, Tokyo, Japan

[73] Assignee: Asahi Kogaku Kogyo Kabushiki Kaisha, Tokyo, Japan

[21] Appl. No.: 922,456

[22] Filed: Sep. 3, 1997

[30] Foreign Application Priority Data

Sep. 6, 1996 [JP] Japan .................................. 8-257843

[51] Int. Cl.⁶ ............................................... G03B 13/36
[52] U.S. Cl. ............................. 396/83; 396/84; 396/374; 396/379
[58] Field of Search .................... 396/79–83, 84, 396/374, 379, 378; 359/696, 697, 698, 699, 700, 823

[56] References Cited

U.S. PATENT DOCUMENTS 5,640,278  6/1997  Mogamiya ........................... 359/823 X
5,678,090  10/1997  Nishimura et al. ..................... 396/379
5,715,482  2/1998  Wakabayashi et al. .................... 396/79

*Primary Examiner*—W. B. Perkey
*Attorney, Agent, or Firm*—Greenblum & Bernstein, P.L.C.

[57] ABSTRACT

The zooming device comprises first and second lens groups movably supported by a guide shaft which is disposed in parallel to a cam shaft, an outer surface of which has first and second cam grooves. First and second pins provided on the first and second lens groups are engaged with the first and second cam grooves, respectively. A cam surface of the first cam groove is inclined to a plane perpendicular to the axis of the cam shaft. By varying the distance between the guide shaft and the cam shaft, the first pin and the first lens group are moved along the optical axis of the lens groups, so that a focusing adjustment is performed.

12 Claims, 6 Drawing Sheets

ZOOMING DEVICE

BACKGROUND OF THE INVENTION

1. Field of the Invention

The present invention relates to a zoom camera in which an electronic viewfinder is mounted in a viewfinder optical system, and more specifically, to a zooming device for the viewfinder optical system.

2. Description of the Related Art

Conventionally, there is known a zoom camera in which a viewfinder optical system and a photographing optical system are independently provided and operated with respect to each other. An electronic viewfinder, containing a CCD imaging device, is provided as part of the viewfinder optical system, so that an object image can be observed through a liquid crystal display (LCD) panel. In a photographing operation of the camera, the release switch is partly depressed so that a photometry measurement and a distance measurement are carried out. Then, when the release switch is fully depressed, the photographing optical system is focus-controlled so that a focused object image can be recorded on a film. A zooming operation of the photographing optical system is performed by operating a zooming switch, whereby a zooming operation is simultaneously carried out in the viewfinder optical system. Although a focusing operation is not carried out in the viewfinder optical system, the photographer can observe a focused object image through the viewfinder, since the viewfinder is "fixed-focus" and, human eyes automatically control the focus of the image.

Thus, since the viewfinder optical system is not provided with a focus control mechanism, an object image which is out of focus may be indicated on the electronic viewfinder. Although a focus control mechanism can be provided in the viewfinder optical system, the camera body would become bulky, since a mechanism and electric circuit for controlling the finder focus control mechanism, separated from those of the photographing optical system, would be provided. Further, the additional focus control mechanism for the viewfinder optical system would make manufacturing expensive. Further, the consumption of electric power by the camera would be increased.

SUMMARY OF THE INVENTION

Therefore, an object of the invention is to provide a zooming device which can perform a zooming operation with a mechanism and a circuit which have simple structures.

According to the present invention, there is provided a zooming device for a camera, comprising a guide member, a cam, first and second lens groups supported by the guide member, and a distance adjusting mechanism.

The cam has first and second cam surfaces. The first and second lens groups are movable along an optical axis thereof independently from each other. The first and second lens groups have first and second cam followers, respectively, which are engaged with the first and second cam surfaces, respectively. The distance adjusting mechanism adjusts a distance between the guide member and the cam. The cam is moved, whereby the first and second lens groups are displaced along the first and second cam surfaces so that a zooming operation is performed. The distance is adjusted, whereby at least one of the first or second lens groups is displaced along the optical axis so that a focus adjustment is performed.

Further, according to the present invention, there is provided a zooming device for a camera, comprising a first lens group, a second lens group, a guide member, a cam shaft, a distance adjusting mechanism and a cam moving mechanism.

The first lens group has a first cam follower. The second lens group has a second cam follower. The guide member movably supports the first and second lens groups, so that the first and second lens groups can be moved along an optical axis of the first and second lens groups. The cam shaft has first and second cams. The first cam is engaged with the first cam follower. The second cam is engaged with the second cam follower. The distance adjusting mechanism adjusts a distance between the guide member and the cam shaft. The cam moving mechanism moves the cam shaft about an axis thereof. The engagements between the first and second cams and the first and second cam followers are adjusted, respectively, in accordance with the distance, so that a position of an imaging plane, on which an object image is formed by the first and second lens groups, is changed. The cam shaft is moved, so that the first and second lens groups are moved along the optical axis, while maintaining the position of the imaging plane, whereby a zooming operation is carried out.

Furthermore, according to the present invention, there is provided a zooming device for a camera, comprising first and second frame members in which first and second lenses are supported, respectively, a guide member, a cam shaft, a distance adjusting mechanism and a control mechanism.

The first and second lenses are moved along an optical axis thereof so that a zooming operation is carried out. The first lens is moved relative to the second lens so that a focusing operation is carried out. The guide member supports the first and second frame members, respectively, so that the first and second frame members are moved along the optical axis. The cam shaft has cam grooves with which the first and second frame members are engaged. The cam shaft is moved so that a positional relationship between the first and second frame members is changed. The distance adjusting mechanism adjusts a distance between the guide member and the cam shaft. The control mechanism controls a movement of the cam shaft and an operation of the distance adjusting mechanism, respectively. One of the cam grooves, with which the first frame member is engaged, has a shape such that a portion of the one of the cam grooves, which is engaged with the first frame member, is changed in accordance with said distance.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
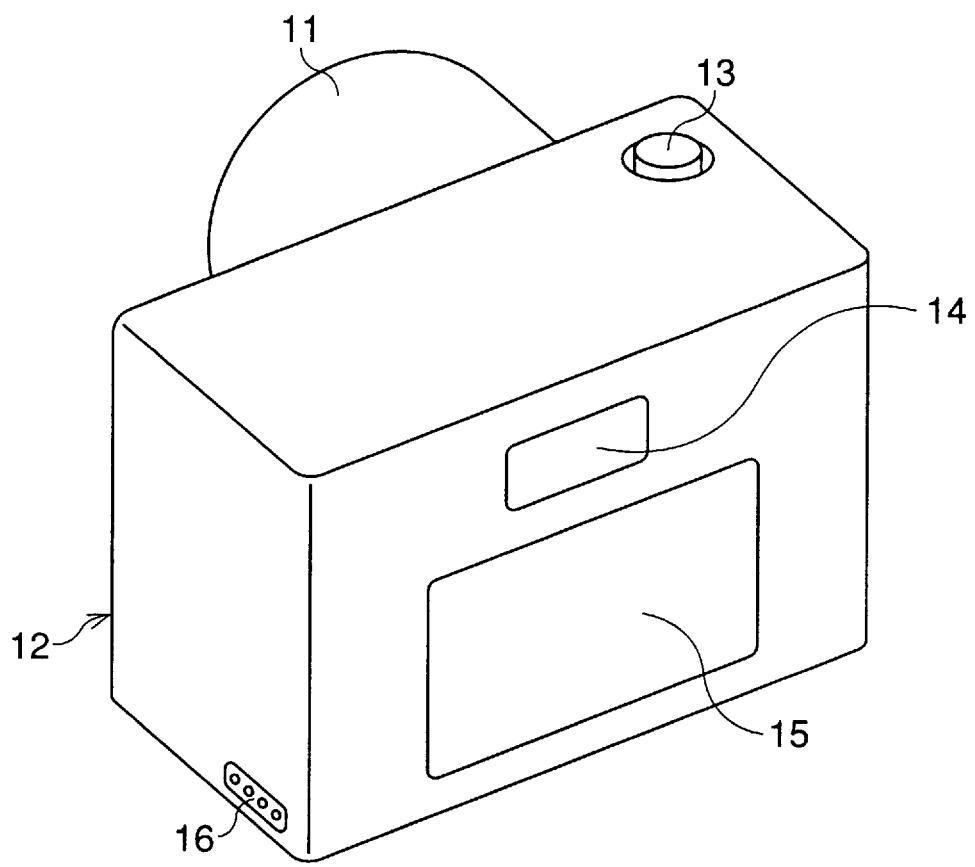
FIG. 1 is a perspective view showing a back side of a zoom compact camera in which a zooming device of an embodiment of the present invention is provided.

The present invention will be described below with reference to embodiments shown in the drawings.

FIG. 1 is a perspective view showing a back side of a zoom compact camera in which a zooming device of an embodiment of the present invention is provided. A lens barrel 11, in which a photographing optical system (Shown, e.g., in FIG. 7) is housed, is attached onto a front surface of a camera body 12. A release switch 13 is provided on an upper surface of the camera body 12. A viewfinder eyepiece 14 and a liquid crystal display or LCD monitor 15 are disposed on a rear surface of the camera body 12, a side surface of which is provided with an output terminal 16.

Figure 2:
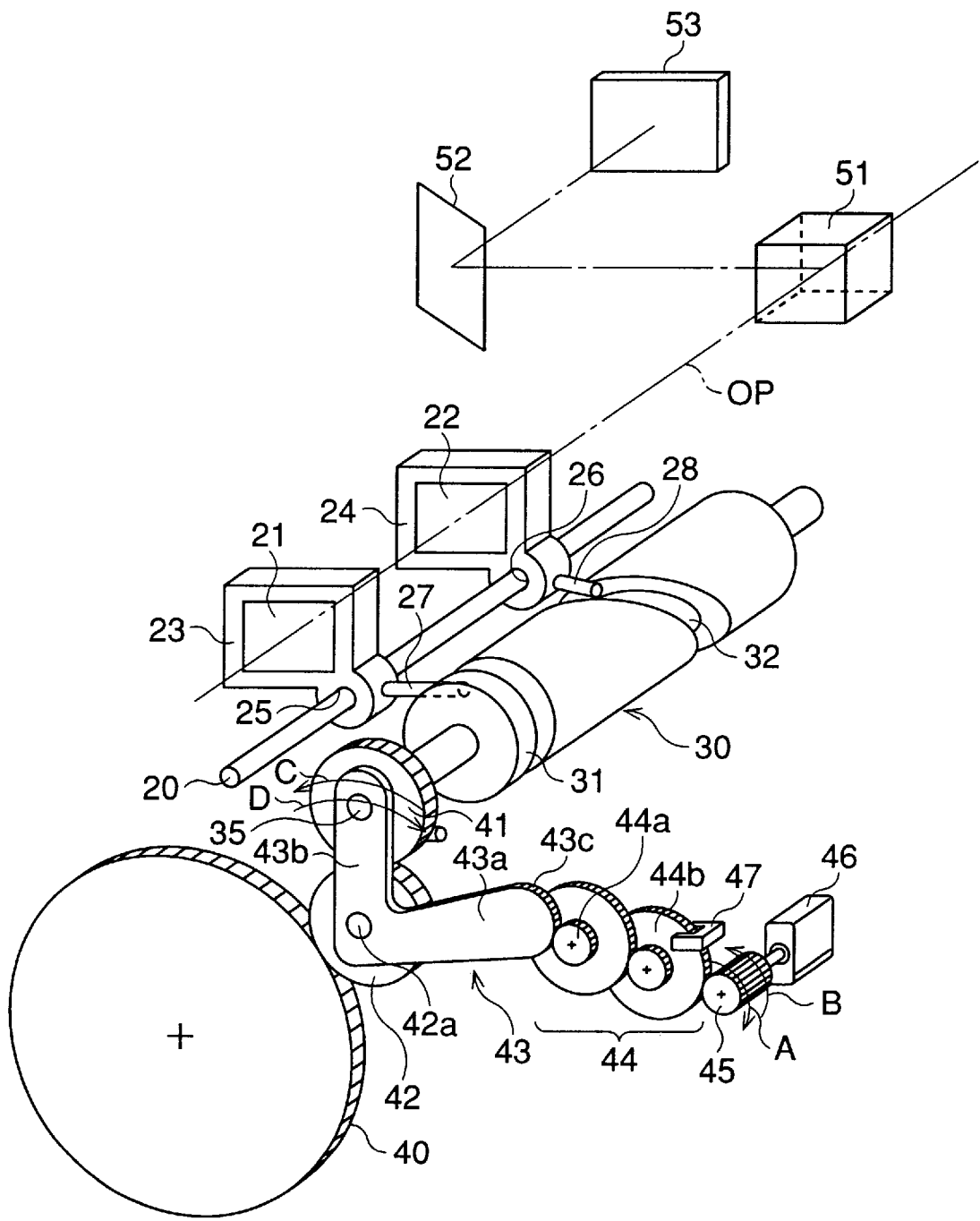
FIG. 2 is a perspective view, from the front side of the camera body, showing the zooming device provided in a viewfinder optical system.
Figure 3:
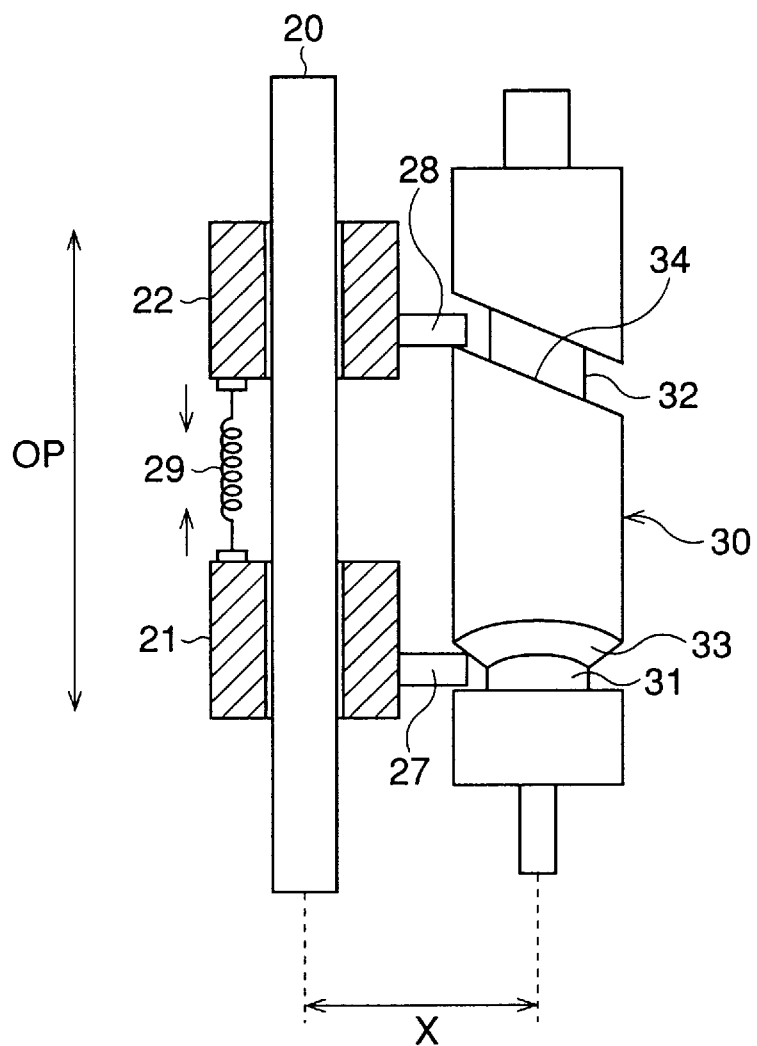
FIG. 3 is a plan view showing the zooming device, viewed from the upper side of the camera body.

FIG. 2 shows the zooming device provided in the viewfinder optical system, viewed from the front side of the camera body 12. FIG. 3 shows the zooming device, viewed from the upper side of the camera body 12.

A guide shaft 20 is disposed in parallel to the optical axis OP of the viewfinder optical system. A cam shaft 30 is a cylindrical member, the longitudinal axis of which is approximately parallel to the guide shaft 20. The cam shaft 30 is rotatable about the axis thereof, and can be moved in a direction approximately perpendicular to the optical axis OP. That is, the distance between the guide shaft 20 and the cam shaft 30 is variable.

First and second lens groups 21 and 22 are fixed in first and second frame members 23 and 24, in which holes 25 and 26 are formed, respectively. The guide shaft 20 is inserted into the holes 25 and 26, thereby enabling the first and second lens groups 21 and 22 to be moved along the optical axis OP of the viewfinder optical system.

Figure 4:
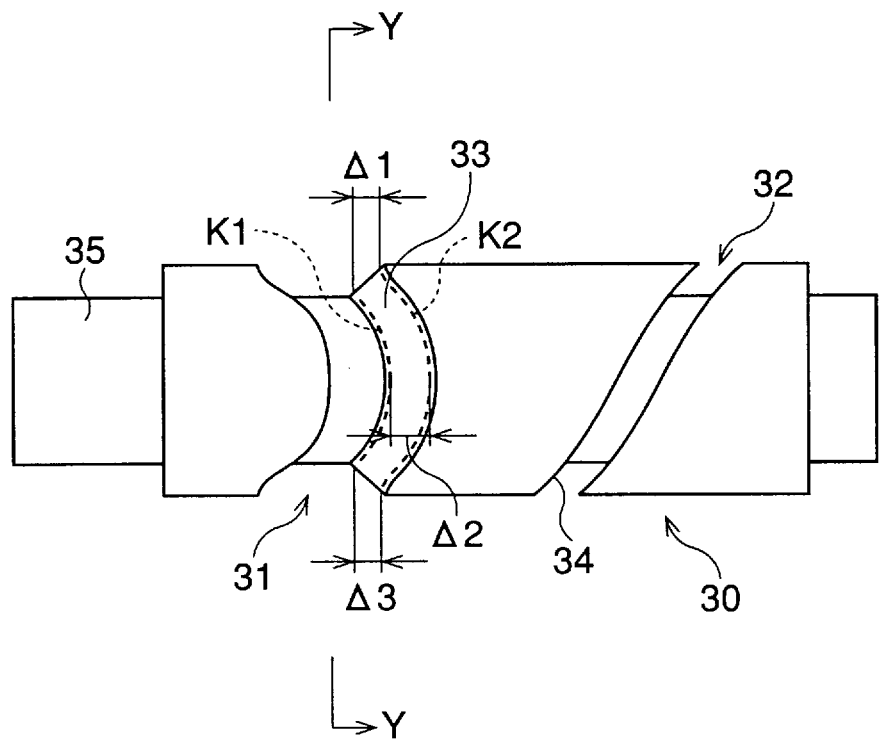
FIG. 4 is a side view of a cam shaft.

First and second pins (i.e., first and second cam followers) 27 and 28 are provided on the first and second frame members 23 and 24, respectively. The first and second pins 27 and 28 are engaged with first and second cam grooves 31 and 32, respectively, which are substantially annular and formed on an outer surface of the cam shaft 30. Cam surfaces of the first and second cam grooves 31 and 32 are inclined to a plane perpendicular to the axis of the cam shaft 30, as shown in FIG. 4.

A spring 29 is provided between the first and second frame members 23 and 24, so that the frame members 23 and 24 are urged towards each other. Under the biasing force of the spring 29, the first pin 27 is engaged with a first cam surface 33, which is a wall of the first cam groove 31. Further, and the second pin 28 is engaged with a second cam surface 34, which is a wall of the second cam groove 32. Accordingly, when the cam shaft 30 is rotated, the first and second lens groups 21 and 22 are displaced along the optical axis in accordance with the shapes of the first and second cam surfaces 33 and 34, which are shaped so that a zooming operation is performed. That is, when the lens groups 21 and 22 are moved due to a rotation of the cam shaft 30, a position of an imaging plane, on which a clear image is formed by the lens groups 21 and 22, is kept constant (i.e., "zooming" denoting changing magnification while maintaining the position of the imaging plane).

A cam shaft gear 41, provided on a rotational axis 35 of the cam shaft 30, is meshed with an intermediate gear 42, which in turn is meshed with a zooming gear 40 which is a part of a zooming mechanism of the photographing optical system. Namely, in a zooming operation of the photographing optical system, the cam shaft 30 is rotated in accordance with a rotation of the zooming gear 40, so that a zooming operation by the lens groups 21 and 22 of the viewfinder optical system is performed.

The intermediate gear 42 has a center axis 42a to which a distance adjusting arm 43 is rotatably supported. The distance adjusting arm 43 has an L-shape, and has first and second arm portions 43a and 43b. A gear 43c is formed on an edge surface of the first arm portion 43a, and is meshed with a first gear 44a provided in a gear train 44. The gear train 44 includes a second gear 44b, which is meshed with a gear 45 fixed on an output shaft of a motor 46. The second arm portion 43b is connected to the rotational axis 35 of the cam shaft 30.

Therefore, when the motor 46 is driven, the distance adjusting arm 43 is rotated, via the gear train 44, so that the cam shaft 30 is displaced, thereby varying a distance between the cam shaft 30 and the guide shaft 20. As shown in FIG. 2, if the gear 45 is rotated in a direction of an arrow A, the distance adjusting arm 43 is rotated in a direction of the arrow C, and thus, the cam shaft 30 is moved toward the guide shaft 20. Conversely, if the gear 45 is rotated in a direction of an arrow B, the distance adjusting arm 43 is rotated in a direction of the arrow D, and thus, the cam shaft 30 is separated further from the guide shaft 20.

The first cam surface 33 (described in detail below) is inclined to a plane perpendicular to the axis of the cam shaft 30. Therefore, by changing the distance between the cam shaft 30 and the guide shaft 20, the position of the first pin 27, i.e., the first lens group 21, is adjusted along the optical axis, so that a focusing operation of the viewfinder is performed. It should be noted that the second lens group 22 is not displaced along the optical axis in the focusing operation, since the second cam surface 34 is not inclined.

A photo-interrupter 47 is provided at a position close to the second gear 44b; the second gear 44b being provided with a plurality of slits (not shown), which extend in radial directions and are arranged coaxially with the gear 44b. By counting the number of the slits passing through the photo-interrupter 47, the amount of rotation of the motor 46 (i.e., the distance between the guide shaft 20 and the cam shaft 30) is sensed. Thus, an encoder is formed by the photo-interrupter 47 and the gear 44b.

A beam-splitter 51 is disposed behind the second lens group 22. A part of the light beam split by the beam splitter 51 is directed to an eyepiece optical system (not shown) of the viewfinder. The other part of the light beam is reflected by a total reflecting mirror 52, and is directed to a CCD imaging device 53 which is a part of an electronic viewfinder.

Figure 5:
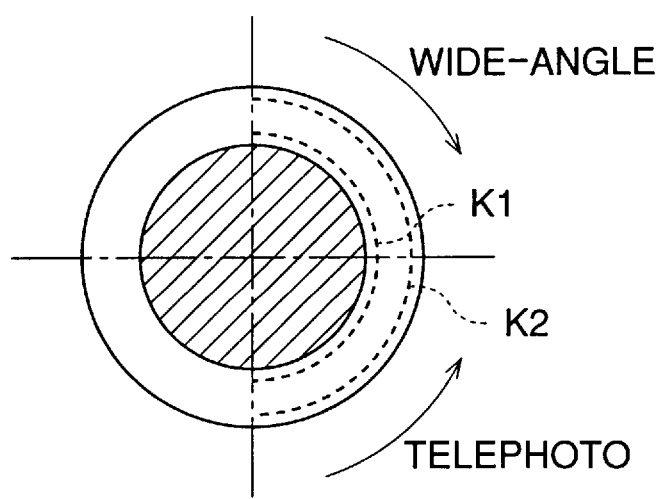
FIG. 5 is a sectional view along line Y—Y shown in FIG. 4.

FIG. 4 shows a side view of the cam shaft 30, and FIG. 5 is a sectional view along line Y—Y shown in FIG. 4. The first and second cam surfaces 33 and 34 are formed in such a manner that a positional relationship between the first and second lens groups 21 and 22 (see FIG. 2) is changed in accordance with the rotation of the cam shaft 30, so that an object image is formed on an imaging surface on the CCD imaging device 53 with a predetermined magnification. That is, when the cam shaft 30 (as viewed from the front side of the camera body 12 (in FIG. 1) is rotated in a counterclockwise direction, the positions of the lens groups 21 and 22 are adjusted to a telephoto condition. Conversely, when the cam shaft 30 is rotated in a clockwise direction, the positions of the lens groups 21 and 22 are adjusted to a wide-angle condition.

Since the first cam surface 33 is inclined to a plane perpendicular to the axis of the cam shaft 30, the position where the first pin 27 engages the first cam surface 33 is changed by varying the distance between the cam shaft 30 and the guide shaft 20. In FIG. 4, a broken line K1 indicates a locus traced by the first pin 27 (along the first cam surface 33) when a zooming operation is carried out in a state in which an object positioned at a short distance (1 meter, for example) from the camera is in a focused condition. A broken line K2 indicates a locus traced by the first pin 27 (again along the first cam surface 33) when a zooming operation is carried out in a state in which an object positioned at a long distance (called an infinite distance, for example) from the camera is in a focused condition.

Figure 6:
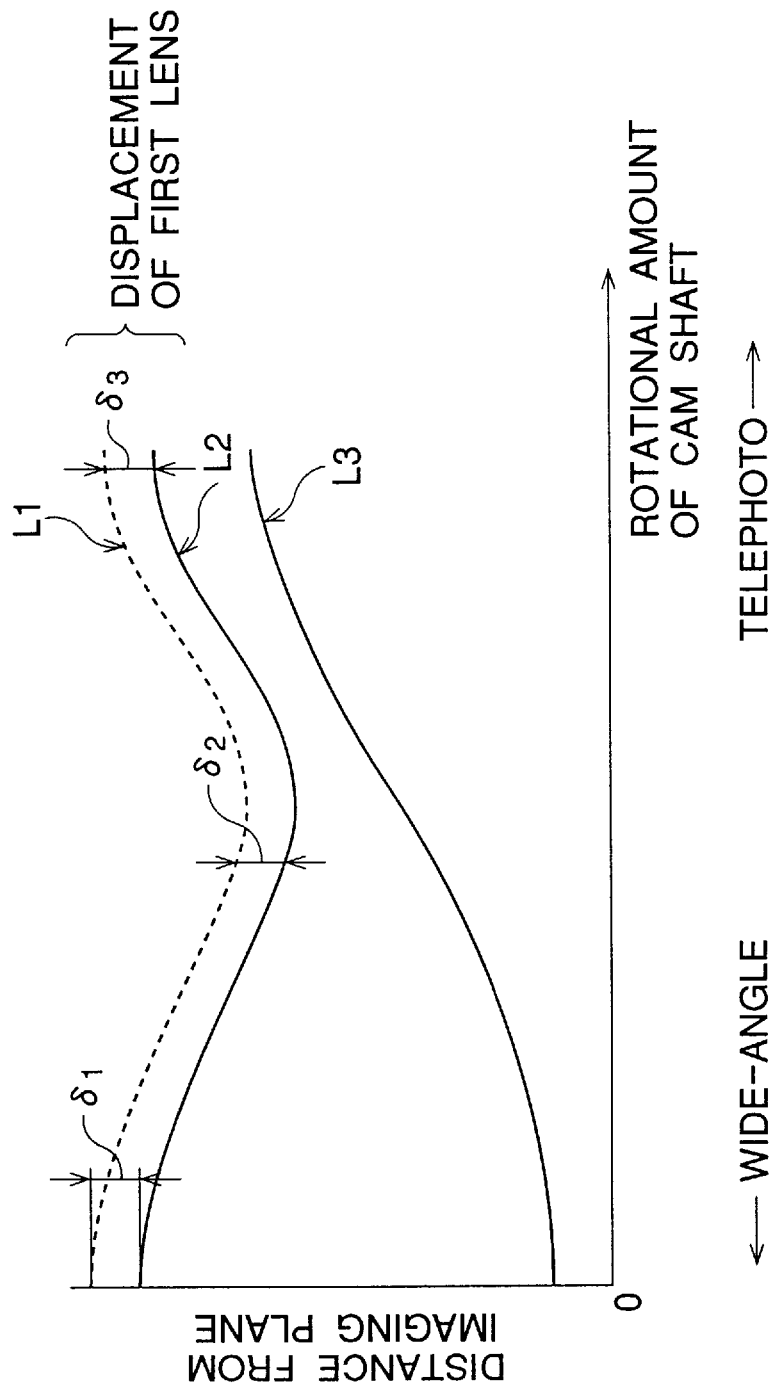
FIG. 6 is a graph indicating a relationship between the positions of the first and second lens groups and the rotational amount of the cam shaft.

FIG. 6 shows a graph indicating a relationship between the positions of the first and second lens groups 21 and 22 and the rotational amount of the cam shaft 30.

In FIG. 6, a broken line L1 indicates a distance between the first lens group 21 and an imaging plane of the CCD imaging device 53; the distance being changed in accordance with a rotation of the cam shaft 30, from the wide-angle condition to the telephoto condition, while the focus for a short distance from the camera is adjusted. A solid line L2 indicates a distance between the first lens group 21 and the imaging plane of the CCD imaging device 53; the distance being changed in accordance with a rotation of the cam shaft 30 from the wide-angle condition to the telephoto condition, while the focus for a long distance from the camera is adjusted. A solid line L3 indicates a distance between the second lens group 22 and the imaging plane of the CCD imaging device 53; the distance being changed in accordance with a rotation of the cam shaft 30 from the wide-angle condition to the telephoto condition.

The difference $\delta_1$ between the broken line L1 and the solid line L2 in the wide-angle condition coincides with a distance $\Delta 1$ (see FIG. 4) from the locus K1 (along which the first pin 27 travels on the first cam surface 33 when a zooming operation is carried out while the short-distance object is in-focus) to the locus K2 (along which the first pin 27 travels on the first cam surface 33 when a zooming operation is carried out while the long-distance object is in-focus) at a wide-angle magnification. Similarly, the difference $\delta_3$ between the broken line L1 and the solid line L2 in the telephoto condition coincides with a distance $\Delta 3$ (see FIG. 4), which is the difference between the locus K1 and the locus K2 at a telephoto magnification. The difference $\delta_2$ between the broken line L1 and the solid line L2, in the intermediate position between wide-angle condition and the telephoto condition, coincides with the distance $\Delta 2$ (see FIG. 4), which is the difference between the locus K1 and the locus K2 at an intermediate magnification.

Figure 7:
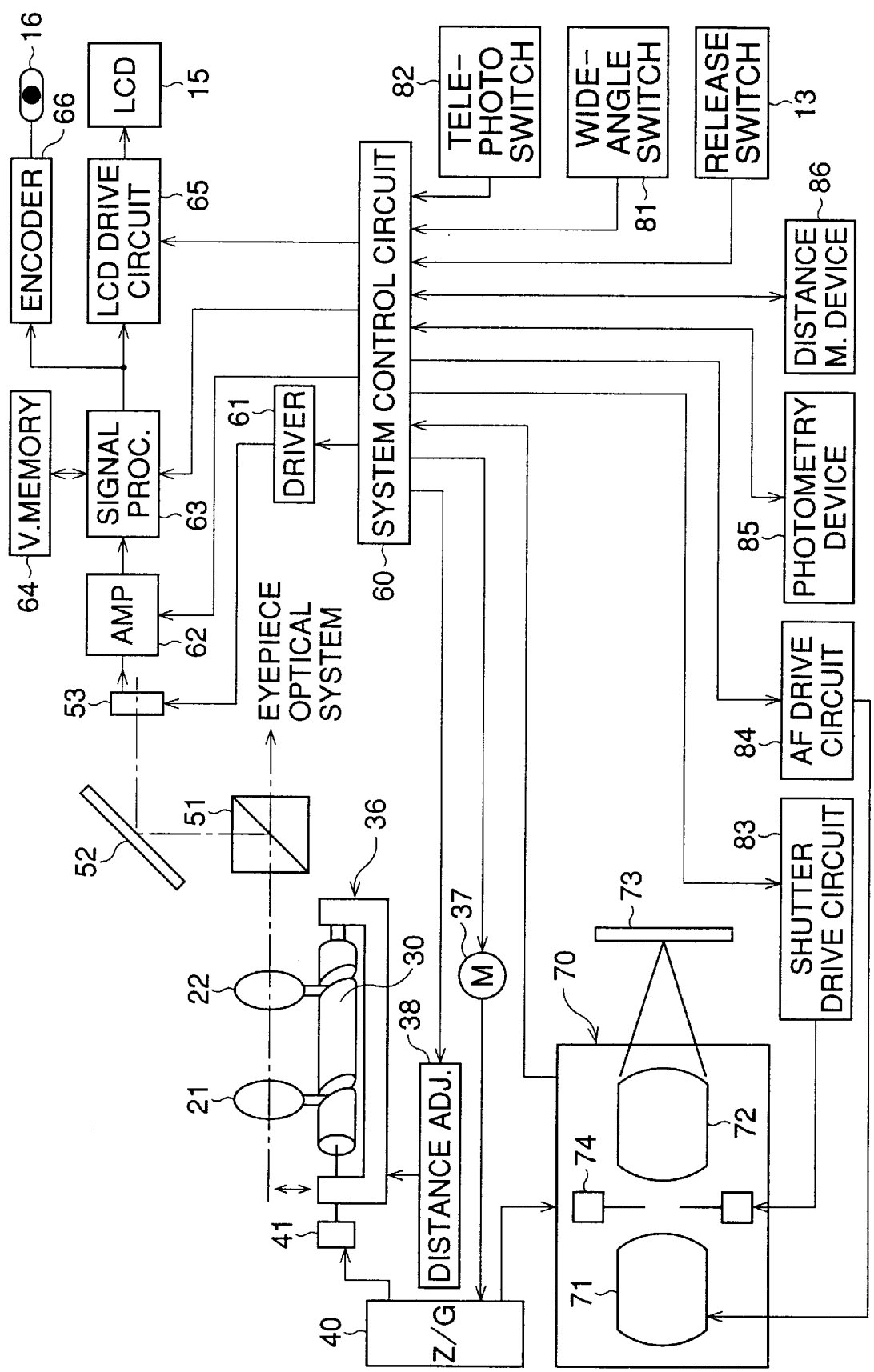
FIG. 7 is a block diagram, including an electric circuit, of a construction of a zoom compact camera shown in FIG. 1.

FIG. 7 shows a block diagram, including an electric circuit, of a construction of the zoom compact camera shown in FIG. 1. The zoom compact camera is controlled by a system control circuit 60 as a whole.

A zooming motor 37 is connected to the system control circuit 60. When the zooming motor 37 is driven in accordance with a control signal from the system control circuit 60, the rotational movement of the zooming motor 37 is transmitted to the zooming gear 40. The zooming gear 40 is connected to a zooming mechanism 70 for the photographing optical system and a zooming mechanism 36 for the viewfinder optical system.

The photographing optical system has first and second lens groups 71 and 72, and a silver halide film 73 disposed behind the second lens group 72. The zooming mechanism 70 is connected to the first and second lens groups 71 and 72. A zooming ring (not shown) of the zooming mechanism 70 is rotated by operating the zooming gear 40, so that the positions of the first and second lens groups 71 and 72 on the optical axis of the photographing optical system are changed, whereby a zooming operation is carried out. A shutter 74, which also operates as an aperture, is disposed between the first and second lens groups 71 and 72.

The first and second lens groups 21 and 22 of the viewfinder optical system are connected to the zooming mechanism 36, which includes the cam shaft gear 41, the intermediate gear 42 (see FIG. 2) and the cam shaft 30, whereby the zooming gear 40 of the photographing optical system is connected to the cam shaft gear 41 through the intermediate gear 42. Namely, as described above, due to a rotation of the zooming gear 40, the zooming operations of the photographing optical system and the viewfinder optical system are carried out simultaneously. Note that, in the zooming operations, the distance adjusting arm 43 is stationary since the motor 46 is not driven.

A distance adjusting mechanism 38 is connected to the motor 46 (see FIG. 2). The distance adjusting mechanism 38 is driven under control of the system control circuit 60, so that the amount of rotation of the motor 46 is controlled, based on an output signal of the encoder including the photo-interrupter 47 and the gear 44b). Thus, the distance between the guide shaft 20 and the cam shaft 30 (i.e., the position of the first lens group 21 of the viewfinder optical system) is adjusted, so that a focusing adjustment of the viewfinder optical system is carried out.

A light beam passing through the first and second lens groups 21 and 22 is split by the beam splitter 51 into two light beams, which are directed to the eyepiece optical system and the total reflecting mirror 52, respectively. The light beam reflected by the total reflecting mirror 52 is led to the CCD imaging device 53, so that an object image is formed on a light receiving surface of the CCD imaging device 53.

The CCD imaging device 53 is driven by a driver 61, so that an image signal is outputted from the CCD imaging device 53. The image signal is amplified by an amplifier 62, and is then binarized in a signal process circuit 63. The binarized image signal is stored in a video memory 64. The image signal is then read from the memory 64, and is converted to conform with a predetermined format by an LCD drive circuit 65, so that an object image is indicated on the LCD monitor 15. The image signal read from the memory 64 also undergoes predetermined encoding process by an encoder 65, and can be output to an external device through the output terminal 16. The driver 61, the amplifier 62, the signal process circuit 63 and the LCD drive circuit 65 are controlled by the system control circuit 60.

The release switch 13, a wide-angle switch 81, a telephoto switch 82, a shutter drive circuit 83, an AF drive circuit 84, a photometry device 85 and a distance measurement device 86 are all connected to the system control circuit 60. The wide-angle switch 81 and the telephoto switch 82 are connected to a zoom lever (not shown) provided on an outer surface of the camera body 12. The wide-angle switch 81 is turned ON by operating the zoom lever to a wide-angle side, and the telephoto switch 82 is turned ON by operating the zoom lever to a telephoto side. When the wide-angle switch 81 is turned ON, each of the lens groups included in the photographing optical system and the viewfinder optical system is moved to a wide-angle side, and when the telephoto switch 82 is turned ON, each of the lens groups included in the photographing optical system and the viewfinder optical system is moved to a telephoto side.

Following the zooming operation, if the release switch 13 is fully depressed, the photometry device 85 and the distance measurement device 86 are driven in accordance with a control signal from the system control circuit 60, and a photometry result and a distance measurement result are input into the system control circuit 60. The shutter drive circuit 83 is controlled based on the photometry result, so that an opening degree and an exposure time of the shutter 74 are determined. Based on the distance measurement result, the AF drive circuit 84 is controlled, whereby the position of the first lens group 71 on the optical axis is adjusted so that automatic focusing is performed. At this time, in the viewfinder optical system, the motor 46 is rotated by the distance adjusting mechanism 38, so that the distance between the guide shaft 20 and the cam shaft 30 is altered. Namely, the position of the first lens group 21 is finely adjusted, so that a focusing adjustment is performed.

In the focusing adjustment of the viewfinder optical system, the initial positions of the first and second lens groups 21 and 22 correspond to focusing at an object distance of "infinity". Namely, before the focusing adjustment is started, the pin 27 of the first lens group 21 is positioned on the broken line K2 shown in FIG. 5. Distance measurement data and the rotational amount of the motor 46, corresponding to the distance measurement are stored in a table format, in a non-volatile memory (not shown) provided in the system control circuit 60. The table is formed such that the rotational amount of the motor 46 is zero when the distance measurement data indicates infinity, and such that the rotational amount of the motor 46 becomes larger as the distance measurement data becomes smaller.

If the release switch 13 is open or turned OFF during the focusing adjustment, the gear 45 of the motor 46 is rotated in a direction of an arrow B shown in FIG. 2, and the distance adjusting arm 43 is rotated in a direction of an arrow D. As a result, the cam shaft 30 is set to the initial position, so that the pin 27 is engaged with the broken line K2 on the first cam surface 33, and thus, the first lens group 21 is also set to the initial position.

Conversely, if the release switch 13 is fully depressed while both the photographing optical system and the viewfinder optical system are set to the in-focus condition due to the focusing adjustment, then the shutter 74 is opened and closed in accordance with the photometry result so that an object image is recorded on the silver halide film. At this time, in the viewfinder optical system, an image signal is read from the CCD imaging device 53 and, for example, is recorded in a recording medium (such as an IC memory card) through a recording device connected to the output terminal 16.

As described above, in the embodiment, when the focusing adjustment of the photographing optical system is carried out, the cam shaft 30 is moved toward or separated from the guide shaft 20, so that the first lens group 21 of the viewfinder optical system is moved along the optical axis to perform the focusing adjustment. Therefore, the focusing adjustment of the viewfinder optical system is carried out simultaneously with the focusing adjustment of the photographing optical system, and the in-focus object image is formed on the CCD imaging device 53, so that a clear object image is indicated on the LCD monitor 15.

Thus, in the embodiment, the focusing adjustment of the viewfinder optical system is performed by a simple construction, which prevents the camera body from being bulky, and restrains both an increase in manufacturing cost and increase in operating electric power consumption.

It should be noted that, although the focusing adjustment of the viewfinder optical system is carried out through the first lens group 21 in the embodiment, the second lens group 22 can be utilized for focusing adjustment instead of the first lens group 21. That is, in an alternative construction, the second cam surface 34 (with which the second pin 28 of the second lens group 22 is engaged) is inclined to a plane perpendicular to the axis of the cam shaft 30.

It should be further noted that the cam grooves 31 and 32 are not necessarily formed on an outer surface of the cam shaft 30 (i.e., a solid cylindrical member) but may be formed, e.g., on a plate member or a cylindrical tube member.

Furthermore, the present invention applies not only to a zoom compact camera, but also to a single-reflex camera, and further to any photographing optical system.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 8-257843 (filed on Sep. 6, 1996) which is expressly incorporated herein by reference, in its entirety.

I claim:

1. A zooming device for a camera, comprising:

a guide member;

a cam having first and second cam surfaces;

a cam driving mechanism for driving said cam;

first and second lens groups, supported by said guide member, being movable along an optical axis thereof independently from each other, said first and second lens groups having first and second cam followers, respectively, which are engaged with said first and second cam surfaces, respectively; and a distance adjusting mechanism adjusting a distance between said guide member and said cam;

said cam being shaped such that when said cam is driven by said cam driving mechanism, said first and second lens groups are displaced along said first and second cam surfaces so that a zooming operation is performed, and when said distance is adjusted by said distance adjusting mechanism, at least one of said first or second lens groups is displaced along the optical axis so that a focus adjustment is performed.

2. A device according to claim 1, wherein said guide member is a shaft, and each of said first and second lens groups are fixed in a frame member, which has a hole fitted on said shaft, so that said first and second lens groups are moved along said optical axis.

3. A device according to claim 1, wherein said cam is driven by rotation about an axis thereof by said cam driving mechanism.

4. A device according to claim 1, wherein said first and second lens groups are fixed in first and second frame members, respectively, and said first and second cam followers being respectively provided to said first and second frame members.

5. A device according to claim 1, wherein said cam comprises a cylindrical member, and said first and second cam surfaces comprise wall surfaces of grooves formed on an outer surface of said cylindrical member.

6. A device according to claim 1, wherein at least one of said first or second cam surfaces is inclined with respect to a direction of said distance in which said guide member and said cam move to come closer to or to separate from each other.

7. A device according to claim 1, wherein said first and second lens groups are included in a viewfinder optical system of said camera.

8. A device according to claim 1, further comprising an imaging device disposed at a position upon which an object image is formed by said first and second lens groups.

9. A device according to claim 1, further comprising a photographing optical system, and a zooming mechanism by which said first and second lens groups perform said zooming operation in association with a zooming operation of said photographing optical system.

10. A device according to claim 9, wherein said distance is adjusted in association with a focusing operation of said photographing optical system.

11. A zooming device for a camera, comprising:

a first lens group having a first cam follower;

a second lens group having a second cam follower, said first and second lens groups forming an object image at an imaging plane;

a guide member movably supporting said first and second lens groups, so that said first and second lens groups can be moved along an optical axis of said first and second lens groups;

a cam shaft having first and second cams, said first cam being engaged with said first cam follower, said second cam being engaged with said second cam follower;

a distance adjusting mechanism adjusting a distance between said guide member and said cam shaft; and a cam driving mechanism driving said cam shaft about an axis thereof;

wherein engagements between said first and second cams and said first and second cam followers are adjusted, respectively, when said distance adjusting mechanism adjusts said distance so that a position of said imaging plane is changed, and wherein when said cam shaft is driven by said cam driving mechanism, a zooming operation is performed as said first and second lens groups are moved along said optical axis while maintaining said position of said imaging plane.

12. A zooming device for a camera, comprising:

first and second frame members in which first and second lenses are supported, respectively, said first and second lenses being moved along an optical axis thereof so that a zooming operation is carried out, and said first and said second lens being moved relative to one another so that a focusing operation is carried out;

a guide member supporting said first and second frame members, respectively, so that said first and second frame members are moved along said optical axis;

a cam shaft having first and second cam grooves with which said first and second frame members are engaged, respectively, said cam shaft being driven so that a positional relationship between said first and second frame members is changed;

a distance adjusting mechanism adjusting a distance between said guide member and said cam shaft; and a control mechanism controlling a movement of said cam shaft and an operation of said distance adjusting mechanism, respectively;

said first cam groove having a shape such that a position of said first frame member supporting said first lens is change in accordance with said distance.

* * * * *